United States Patent
Cai et al.

(10) Patent No.: US 7,413,685 B2
(45) Date of Patent: Aug. 19, 2008

(54) COMPOSITION AND METHOD FOR MAKING FUEL CELL COLLECTOR PLATES WITH IMPROVED PROPERTIES

(75) Inventors: Yuqi Cai, Kingston (CA); Divya Chopra, Kingston (CA); John Fisher, Kingston (CA)

(73) Assignee: E.I. du Pont Canada Company, Ontario (CA)

( * ) Notice: Subject to any disclaimer, the term of this patent is extended or adjusted under 35 U.S.C. 154(b) by 0 days.

(21) Appl. No.: 11/807,714

(22) Filed: May 29, 2007

(65) Prior Publication Data

US 2007/0228338 A1    Oct. 4, 2007

Related U.S. Application Data

(63) Continuation-in-part of application No. 10/660,207, filed on Sep. 11, 2003, now abandoned.

(60) Provisional application No. 60/410,162, filed on Sep. 12, 2002.

(51) Int. Cl.
H01B 1/00 (2006.01)

(52) U.S. Cl. ............... 252/500; 429/249; 429/254; 252/510; 252/511

(58) Field of Classification Search ............... 252/500, 252/511, 510; 429/249, 254
See application file for complete search history.

(56) References Cited

U.S. PATENT DOCUMENTS

| | | | |
|---|---|---|---|
| 4,124,747 A | 11/1978 | Murer et al. | |
| 4,169,816 A | 10/1979 | Tsien | |
| 4,686,072 A | 8/1987 | Fukuda et al. | |
| 5,563,216 A | 10/1996 | Niwano et al. | |
| 5,798,188 A | 8/1998 | Mukohyama et al. | |

(Continued)

FOREIGN PATENT DOCUMENTS

DE    36 33 883 C2    1/1995

(Continued)

OTHER PUBLICATIONS

G. Wu, T. Miura, S. Asai and M. Sumita, Carbon black-loading induced phase fluctuations in PVDF/PMMA miscible blends: dynamic percolation measurements, Polymer 42 (2001) 3271-3279.

(Continued)

*Primary Examiner*—Mark Kopec
*Assistant Examiner*—Jaison P Thomas

(57) ABSTRACT

A method and composition is disclosed for making conductive flow field separator plates having reduced resistivity, lower weight and lower cost. The plates are made by blending from about 0.5 wt % to about 40 wt %, preferably from about 1 wt % to about 30 wt %, most preferably from about 5 wt % to about 20 wt %, of the liquid crystal polymer; from about 0.5 wt % to about 40 wt %, preferably from about 1 wt % to about 30 wt %, most preferably from about 5 wt % to about 20 wt % of the poly(styrene-co-maleic anhydride); and from about 20 wt % to about 99 wt %, preferably from about 60 wt % to about 98 wt %, most preferably from about 70 wt % to about 90 wt % of the conductive filler. The blend is then moulded to form the conductive flow field separator plates.

9 Claims, 5 Drawing Sheets

U.S. PATENT DOCUMENTS

| | | | |
|---|---|---|---|
| 6,180,275 | B1 | 1/2001 | Braun et al. |
| 6,329,450 | B1 | 12/2001 | Ogoe et al. |
| 6,727,023 | B2 | 4/2004 | Ono |
| 6,815,485 | B2 | 11/2004 | Kamo |
| 7,008,991 | B2 | 3/2006 | Takagi et al. |

FOREIGN PATENT DOCUMENTS

| | | |
|---|---|---|
| EP | 0 279 287 A2 | 8/1988 |
| JP | 2004-204004 | 7/2004 |

OTHER PUBLICATIONS

C. del Rio and J. L. Acosta, Extrinsic conducting and superconducting polymer systems: 1. Analysis of the structure of PVDF/PS blends containing copper and carbon black filters, Polymer, vol. 35, No. 17, (1994).

C. del Rio, M. C. Ojeda and J. L. Acosta, Carbon black effect on the microstructure of incompatible polymer blends, European Polymer Journal 36 (2000) 1687-1695.

Available: http://www.polymerprocessing.com/polymers/SMA.html.

Available: http://www.matweb.com/SpecificMaterial.asp?bassnum=O4900&group=General.

Available: http:///www.amco.ws/plastics/nova/dylark.asp.

Available: http://www.amco.ws/plastics/nova/dylark/dylark_332.asp.

Available: http://www.power-technology.com/contractors/fuel/ticonia.

Available: http://www.plasticstechnology.com/articles/200111fa2.html.

Commercial Grades of SMA Resins, ATOFINA Chemicals Inc.

SMA Multi-Functional Resins, Sartomer, 2001 Product Bulletin.

NOVA Chemicals Bold Solutions, Dylark Engineering Resins.

Figure 1(a) and (b):
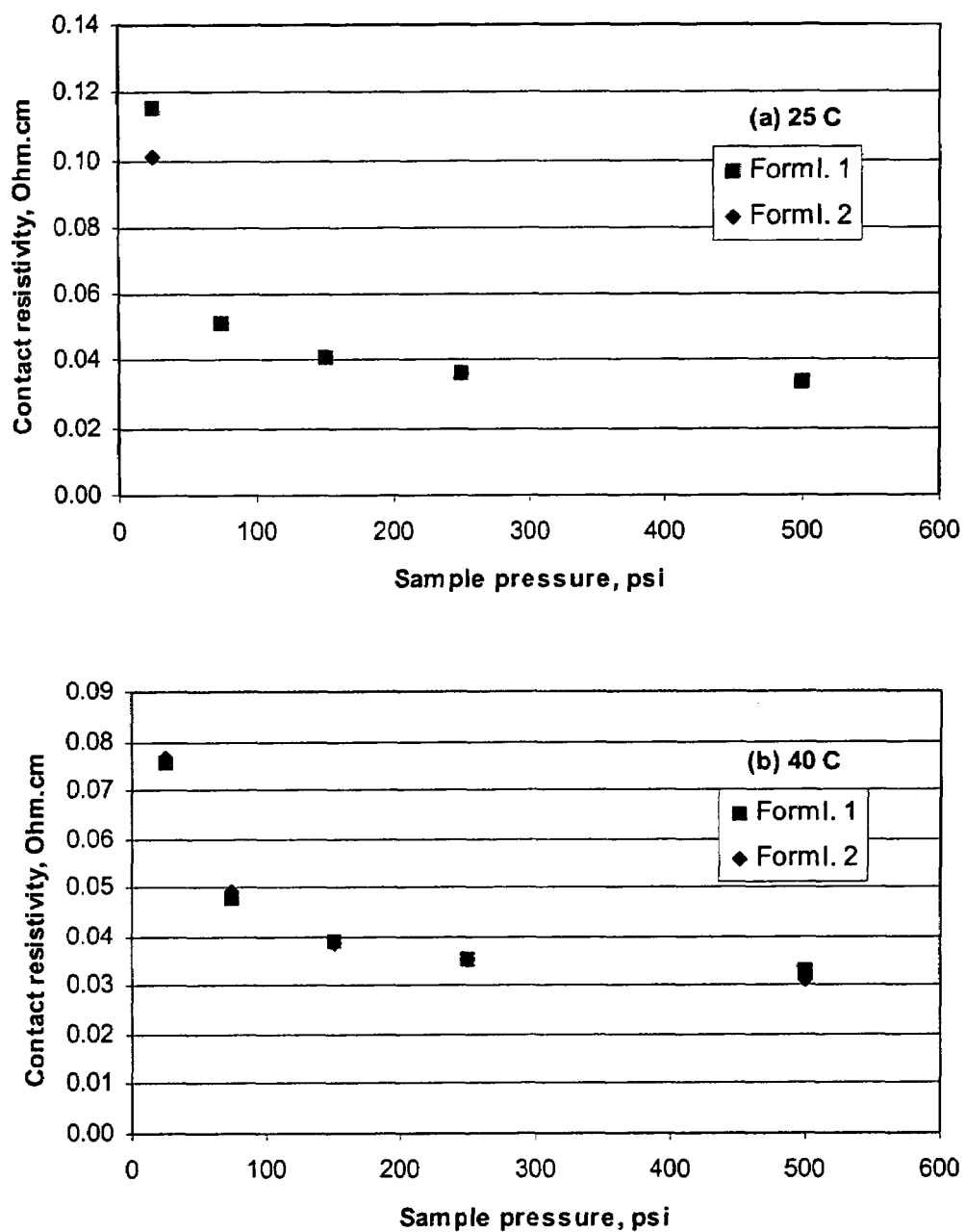

Figure 1(c) and (d):
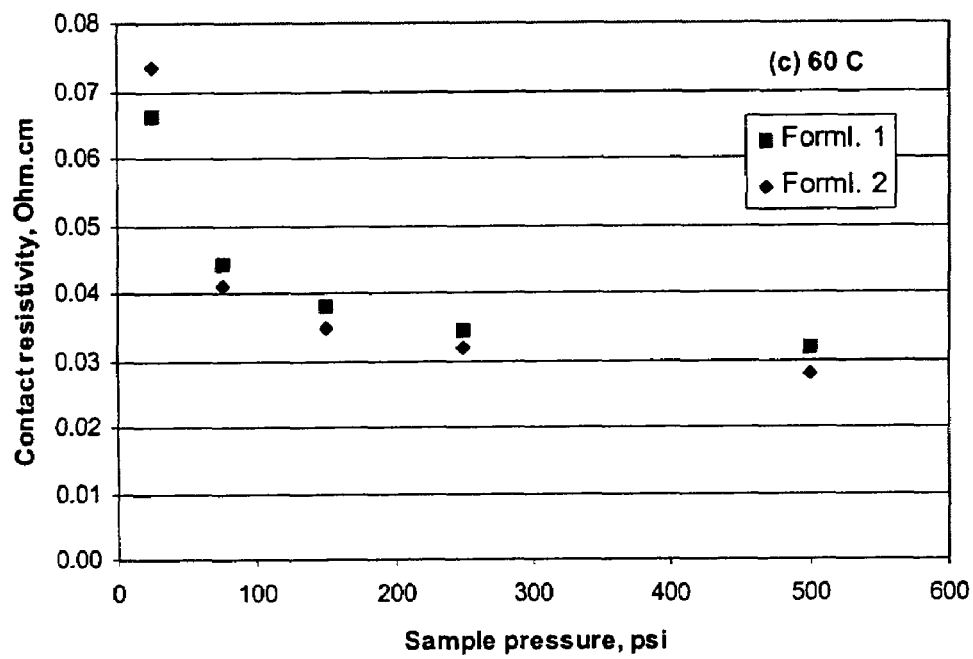
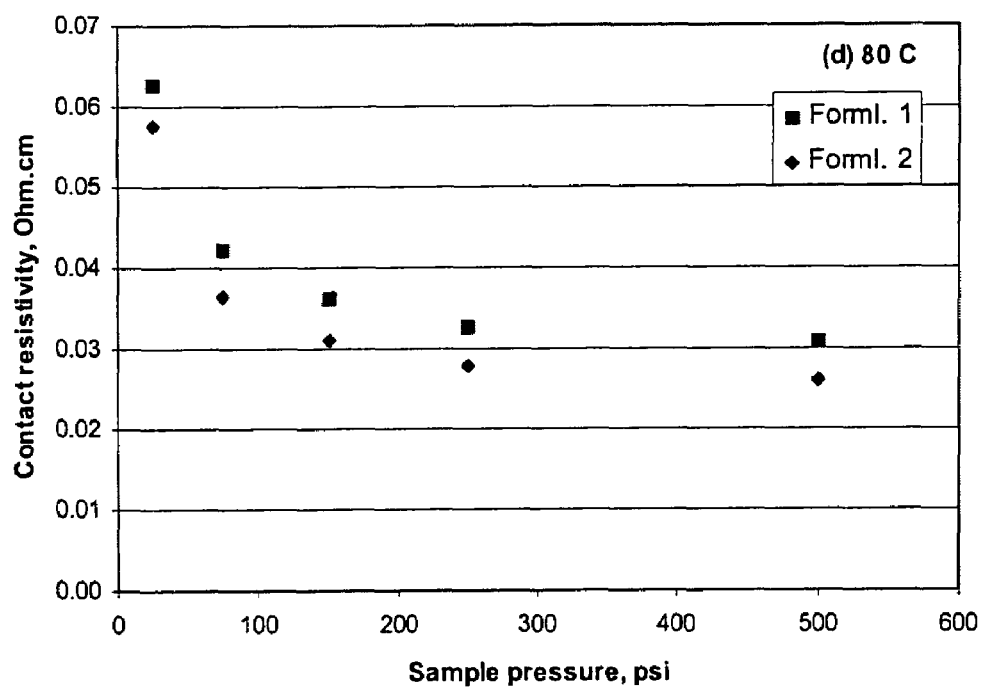

Figure 1(e) and (f):
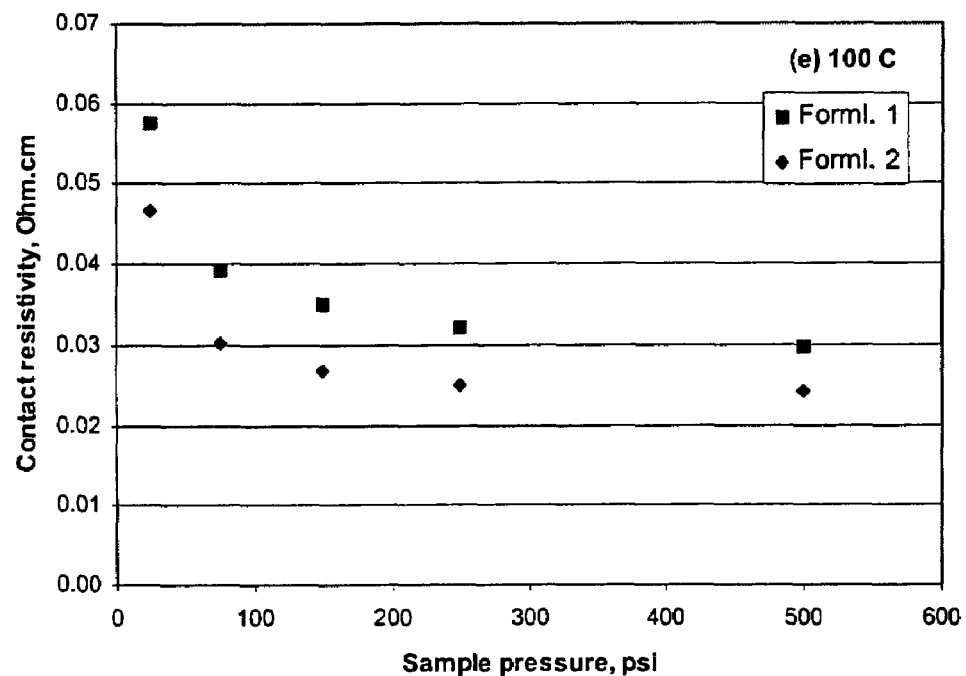
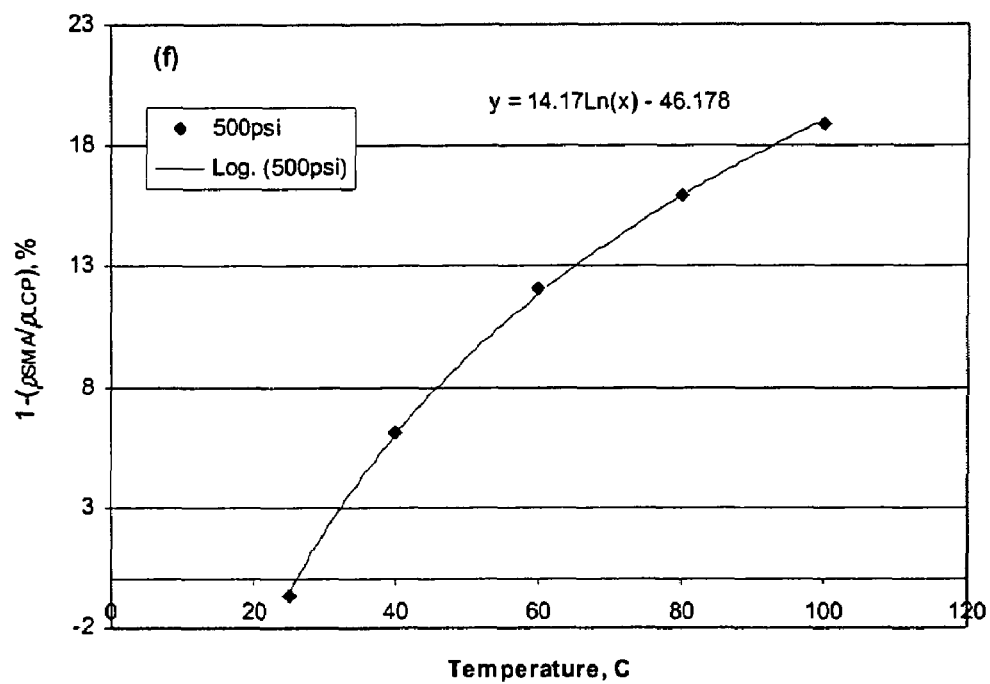

COMPOSITION AND METHOD FOR MAKING FUEL CELL COLLECTOR PLATES WITH IMPROVED PROPERTIES

FIELD OF THE INVENTION

This invention relates to conductive flow field separator plates having reduced resistivity and methods for making such plates. The plates comprise a liquid crystal polymer, poly(styrene-co-maleic anhydride) polymer and conductive filler.

BACKGROUND OF THE INVENTION

The cost of fuel cells must be reduced dramatically to become commercially viable on a larger scale. The cost of the flow field plates, including the cost of forming the flow field onto the plate, represents a significant portion of the total cost within a fuel cell. Therefore, cost reduction of the flow field plate is imperative to enable fuel cells to become commercially viable on a larger scale. The cost reduction can be manifested in several ways including reducing the cost of the materials that are used to make the plate, reducing the manufacturing cost associated with making the plate, and/or improving the function/performance of the plate within a fuel cell so that the same fuel cell can produce electrical power more efficiently and/or produce more electrical power within the same fuel cell.

A typical Polymer-Electrolyte-Membrane (PEM) fuel cell comprises several components. These components typically include a membrane, catalyst layers on the anode and cathode sides of the membrane known as the gas diffusion electrodes, and gas diffusion backings on each side. The membrane, electrode layers and gas diffusion backings are laminated together to create the membrane electrode assembly (MEA). Each MEA is sealed between two thermally and electrically conducting flow field plates. Each cell is then "stacked" with other cells to achieve the required voltage and power output to form a fuel cell stack. Each stack is subjected to a compressive load to ensure good electrical contact between individual cells.

In operation, fuel is introduced on the anode side of the cell through flow field channels in the conductive flow field plates. The channels uniformly distribute fuel across the active area of the cell. The fuel then passes through the gas diffusion backing of the anode and travels to the anode catalyst layer. Air or oxygen is introduced on the cathode side of the cell, which travels through the gas diffusion backing of the cathode to the cathode catalyst layer. Both catalyst layers are porous structures that contain precious metal catalysts, carbon particles, ion-conducting NAFION® particles, and, in some cases, specially engineered hydrophobic and hydrophilic regions. At the anode side, the fuel is electrochemically oxidized to produce protons and electrons. The protons must travel from anode side, across the ion-conducting electrolyte membrane, finally to the cathode side in order to react with the oxygen at the cathode catalyst sites. The electrons produced at the anode side must be conducted through the electrically conducting porous gas diffusion backing to the conducting flow field plates. As soon as the flow field plate at the anode is connected with the flow field plate at the cathode via an external circuit, the electrons will flow from the anode through the circuit to the cathode. The oxygen at the cathode side will combine protons and electrons to form water as the by-product of the electrochemical reaction. The by-products must be continually removed via the flow field plate at the cathode side in order to sustain efficient operation of the cell. Water is the only by-product if hydrogen is used as the fuel while water and carbon dioxide are the by-products if methanol is used as the fuel.

Conductive flow field plates comprise the outer layers of a fuel cell and serve a number of functions: they provide structural integrity to the fuel cell; protect the fuel cell from corrosive degradation over the operating life of the fuel cell; and, most importantly conduct electrons and heat from the interior of the fuel cell to the exterior. Conductivity at the interface between the flow field plate and the outermost interior layer, i.e., gas diffusion layer, is critical for minimizing resistance in the fuel cell.

Because of the unique set of performance requirements of conductive flow field plates and the aggressive conditions inside the fuel cell, the material options for constructing conductive flow field plates are limited. In general, graphite has been used for conductive flow field plates because of its high electrical conductivity and resistance to corrosion. Graphite however is typically produced in 6 mm thick slabs, adding both weight and bulk to the fuel cell and decreasing its power density when in use.

Carbon/graphite fillers in plastic polymers have been identified as a promising alternative to graphite in manufacturing conductive flow field plates. Processes for preparing such plates are disclosed in U.S. Pat. No. 4,124,747 to Murer and Amadei, U.S. Pat. No. 4,169,816 to Tsien and U.S. Pat. No. 4,686,072 to Fukuda.

While these carbon/graphite filler plates provide increased durability and flexibility to the fuel cell, the composition of carbon/graphite filler plates provides less than superior conductivity and resistivity (both bulk resistivity and through plane resistivity) properties. Attempts have been made to reduce the resistivity of a molded plate by machining the surface of the molded plate to eliminate the polymer rich skin layer from the surface of the plate. Such machining processes however are time consuming and expensive.

Conductive fuel cell collector plates have been made with different kinds of blends, including the following blends:

a. Graphite filled liquid crystal polymer plates;
b. Graphite filled polyvinylidene fluoride (PVDF) plates; and
c. Graphite filled thermoset (vinyl ester) plates.

The use of graphite filled binary polymer blends for improving conductive properties alongside other mechanical and thermal properties is well known. Some of the work done in this area includes:

a. Wu et al 2001 (Wu G, Miura T, Asai S, Sumita M, "Carbon Black-Loading Induced Phase Fluctuations In PVDF/PMMA Miscible Blends: Dynamic Percolation Measurements", Polymer 42 (2001) 3271-3279) investigated carbon filled polyvinylidene fluoride / poly(methyl methacrylate) (PVDF/PMMA) blends. They found that the carbon black induces phase fluctuations in PVDF/PMMA blends to reduce percolation threshold.

b. Del Rio et al 1994 (Del Rio C, Acosta J L, Polymer 35 (1994) 3752) found that carbon black and Cu compatibilize polyvinylidene fluoride/polystyrene (PVDF/PS) systems and also result in improvement of electrical properties.

c. Del Rio et al 2000 (Del Rio C, Ojeda M C, Acosta J L, "Carbon Black Effect On The Microstructure Of Incompatible Polymer Blends", European Polymer Journal 36 (2000) 1687-1695) did a detailed study on the morphology and thermal properties of carbon filled polyvinylidene fluoride / polyamide 6 (PVDF/PA6) blends. They found that carbon black induces partial compatibilization and modifies isothermal crystallization kinetics in these blends.

The disclosures of all patents/applications and documents referenced herein are incorporated herein by reference.

There remains a need for a new composition for the conductive fuel cell collector plates with reduced resistivity and lighter weight without compromising necessary plate conductivity and strength. Also, it is preferred to make the plates with cheaper materials to bring down the cost of the fuel cell.

SUMMARY OF THE INVENTION

In accordance with one aspect of the present invention, there is provided an electrically conductive shaped article comprising a liquid crystal polymer, poly(styrene-co-maleic anhydride) and conductive filler.

Preferably, the shaped article comprises:
(a) from about 0.5 wt % to about 40 wt %, preferably from about 1 wt % to about 30 wt %, most preferably from about 5 wt % to about 20 wt %, of the liquid crystal polymer;
(b) from about 0.5 wt % to about 40 wt %, preferably from about 1 wt % to about 30 wt %, most preferably from about 5 wt % to about 20 wt % of the poly(styrene-co-maleic anhydride); and
(c) from about 20 wt % to about 99 wt %, preferably from about 60 wt % to about 98 wt %, most preferably from about 70 wt % to about 90 wt % of the conductive filler.

Preferably, the electrically conductive shaped article is a conductive flow field separator plate for use in fuel cells such as direct methanol fuel cell, hydrogen fuel cell and any other known to those skilled in the art. Other applications include electrosynthesis.

In accordance with a second aspect of the present invention, there is provided a method of making a conductive flow field separator plate having reduced resistivity, and lower cost comprising the steps of:
(a) blending a liquid crystal polymer, poly(styrene-co-maleic anhydride) and conductive filler together to form a blend; and
(b) compression moulding the blend to form the conductive flow field separator plate.

Preferably, step (a) of the method comprises blending the following components:
(a) from about 0.5 wt % to about 40 wt %, preferably from about 1 wt % to about 30 wt %, most preferably from about 5 wt % to about 20 wt %, of the liquid crystal polymer;
(b) from about 0.5 wt % to about 40 wt %, preferably from about 1 wt % to about 30 wt %, most preferably from about 5 wt % to about 20 wt % of the poly(styrene-co-maleic anhydride); and
(c) from about 20 wt % to about 99 wt %, preferably from about 60 wt % to about 98 wt %, most preferably from about 70 wt % to about 90 wt % of the conductive filler.

The conductive compositions of the present invention can be molded into conductive plates through a variety of different molding methods including compression molding, injection molding, injection-compression molding, extrusion, calendering, transfer molding or a combination of them. Based on the melting range of the resins, the compositions can be compounded and molded in the temperature range from 150° C. to 380° C. and preferably from 200° C. to 350° C.

BRIEF DESCRIPTION OF THE DRAWINGS

The preferred embodiments of the present invention will be described with reference to the accompanying drawings:

FIG. 1(a)-(e) illustrate the temperature dependence of bipolar plate conductivity measured at various pressures;

FIG. 1(f) illustrates the drop in resistivity of LCP containing plates in comparison to SMA containing plates measured at 500 psi and various temperatures.

DETAILED DESCRIPTION OF THE PREFERRED EMBODIMENTS

Figure 2:
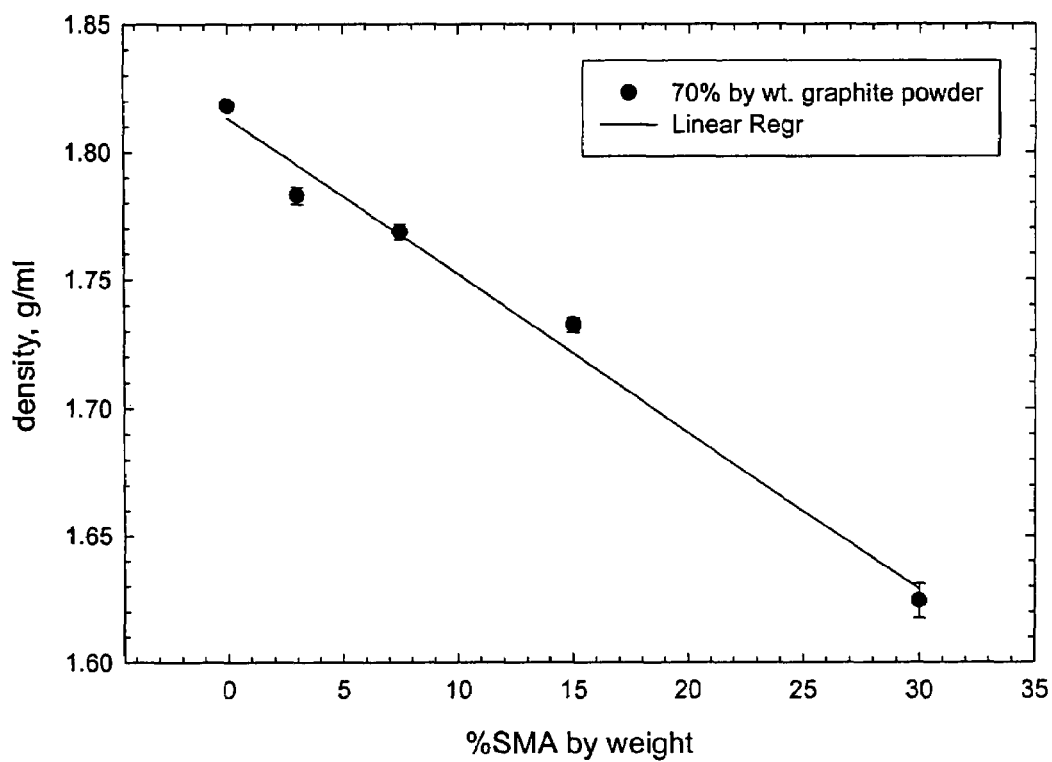
FIG. 2 illustrates the decrease in plate density as a function of SMA content in the plates.

The preferred embodiments of the present invention will now be described with reference to the accompanying figures.

It has been found that conductive flow field separator plates made of a blend of liquid crystal polymer (LCP), poly(styrene-co-maleic anhydride) (SMA) and graphite fillers can be at least as conductive as plates made from blends of LCP and graphite filler only. LCP is very expensive relative to the cost of SMA, therefore, reducing the amount of LCP required in the blend to make the plate reduces the overall raw material cost of the plate. Also, the incorporation of SMA to LCP helps to make the plates lighter.

Preferably, the blend used to make the conductive plates comprises:
(a) from about 0.5 wt % to about 40 wt %, preferably from about 1 wt % to about 30 wt %, most preferably from about 5 wt % to about 20 wt %, of the liquid crystal polymer;
(b) from about 0.5 wt % to about 40 wt %, preferably from about 1 wt % to about 30 wt %, most preferably from about 5 wt % to about 20 wt % of the poly(styrene-co-maleic anhydride); and
(c) from about 20 wt % to about 99 wt %, preferably from about 60 wt % to about 98 wt %, most preferably from about 70 wt % to about 90 wt % of the conductive filler, preferably graphite filler.

Further, depending on the amount of SMA incorporated into the LCP, the raw material price for making the conductive plates is reduced by 20-50% due to the decrease in the amount of LCP needed. The cost of SMA is approximately 10% that of LCP.

Poly(styrene-co-maleic anhydride) is formed from the copolymerization of styrene with maleic anhydride. The reaction is as follows:

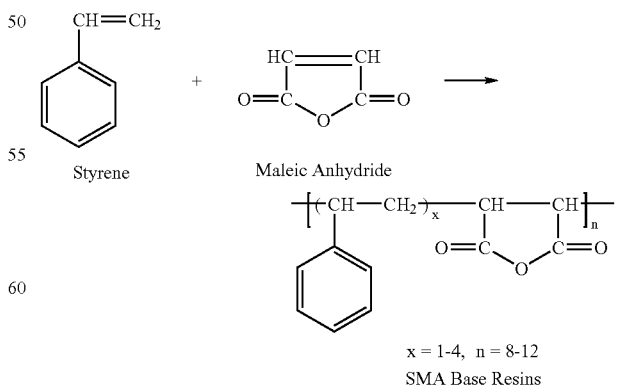

SMA Base Resins

SMA, also known as poly(styrene-co-maleic anhydride), has high functionality, high thermal properties and good resistance to acidic environments. Generally, the SMA has from about 1% to about 75%, preferably from about 1% to 50%, most preferably from about 1% to about 32%, maleic anhydride moieties. The preferred grades of SMA are supplied by Nova Chemicals, Beaver Valley, PA under the trade name of DYLARK®332 and Dylark®232. Rubber filled SMA grades are also available from Nova Chemicals, if high impact strength is required. DYLARK®332 is a clear grade of SMA containing about 14% maleic anhydride moieties and DYLARK®232 only 8%. Another source of preferred SMA is Chemcor Inc., NY, which supplies SMA in an emulsion form under the trade name of SMA1000®. The properties of SMA1000® emulsion include: 1:1 ratio of styrene : maleic anhydride, 25% solids, and the melting point of the dried emulsion is in the range of 150° C. to 170° C.

A preferred form of LCP for use in the present invention is liquid crystalline polyester, which exhibits excellent chemical resistance, thermal stability and gas barrier properties. Preferred LCPs are Liquid Crystalline Polyesters sold by E.I. DuPont de Nemours under the trade names ZENITE®2000, ZENITE®400, ZENITE®6000, ZENITE®800.

In order for the plates to have the desired electrical conductivity, the plates should be made of a blend containing conductive filler. Preferred conductive fillers are graphite fillers such as graphite fibres and graphite powders. Conoco supplies graphite powder under the trademark THERMOCARB®. Also preferred as the conductive fillers are carbon nanotubes.

The method of making the conductive fuel cell collector plates includes the steps of:

(a) blending a liquid crystal polymer, poly(styrene-co-maleic anhydride) and conductive filler together to form a blend; and (b) moulding the blend to form the conductive flow field separator plate.

Preferably, the separator plate may be molded using a molding process such as compression, injection, extrusion, including molding the flow field pattern onto a surface or both surfaces of the plate. Alternatively, the flow field pattern may be machined onto the surfaces after the plate has been molded. The plates generally have a total cross sectional thickness of from about 0.5 mm to about 5 mm.

The following examples illustrate the various advantages of the preferred composition and method of the present invention.

EXAMPLES

In these examples, plates were made from one or more polymers (non-conductive portion) and graphite powder and filler (conductive portion). The two polymers used were SMA and LCP. Two types of conductive fillers were used: graphite powder and graphite fiber. Conoco supplied both types of conductive fillers. The conductive fillers used had the following properties:

Synthetic graphite powder:
  a. Particle size distribution range: from 20 μm to 1500 μm; Average size: 240 μm BET (Multi-point or Single-point, Brunauer, Emmett and Teller method)
  b. Surface Area: 2-3 m²/g
  c. Bulk density: 0.5-0.7 g/cm³
  d. Real density: 2-2.21 g/cm³

Pitch-based graphite fiber with no surface sizing or treatment

| | |
|---|---|
| a. Fiber length distribution range: | from 15 to 500 μm; Average size = 106 μm |
| b. Fiber diameter | 8-10 μm |
| c. Bulk density | 0.3-0.5 g/cm³ |
| d. Real density | 2-2.21 g/cm³ |

Through plane resistivity was measured using the contact resistance method in which the conductive flow field plate was placed between two gold plates at 314 psi. A power supply was used to send a known current through the gold plates and resistance (R) is calculated using Ohm's Law, i.e., the formula $I=V/R$, where I is the current in amps and V is the potential drop in mV as read from the multimeter. Through plane resistivity can be calculated using the equation: $\rho = R \times A/T$, where A is the area of the plate and T is the thickness of the plate.

Example 1

This example compares the through plane resistivity of plates made with SMA as binder to that of LCP. Nova Chemicals, Beaver Valley, Pa. supplied SMA under the trade name of DYLARK®232, and E.I. DuPont de Nemours supplied LCP under the trade name of ZENITE®800. The formulations are set out in Table 1.

TABLE 1

| | Formulation# | |
|---|---|---|
| Ingredients (by weight %) | 1 | 2 |
| Graphite fiber, % | 20 | 20 |
| Thermocarb ™ (graphite powder), % | 57 | 55 |
| Dylark ™ 232 (powder), % | 0 | 25 |
| Zenite ™ 800, % | 23 | 0 |

Both formulations were melt blended. Formulation (1) was compounded using a Coperion Buss® kneader at 310° C.-320° C. Formulation (2) was melt blended in a Brabender™ lab mixer at 230 C and 40 rpm. The compounded material was cooled to room temperature and then molded into a 4"×4" plate. The molding procedure comprised preheating the mold to 235° C. with 50 g of the weighed materials for 10 min under a pre-clamp force of 2000 lbs; increasing the clamp force to 8000 lbs and holding for 10 min; increasing the clamp force to 10000 lbs for 2 min and then cooling down the mold to 90° C. before ejecting the plate. Both plates were scrubbed on both surfaces with a Scotch-Brite™ pad and subsequently subjected to through plane resistivity measurements at various temperatures and pressure. The results are shown in FIGS. 1(a) to (e).

The results illustrate a higher reduction in resistivity of the SMA containing plate (Formulation 2) at various temperatures and at a 500 psi sample pressure in comparison to the LCP plate (Formulation 1). This difference becomes more significant at the typical PEM fuel cell operation temperature range from 80-100° C.

Example 2

This example compares the conductivity property of bipolar plates, which use LCP only as a binder, to those that use blends of LCP and SMA. Approximately 250 g of Formulations 3-7 (see Table 2) were melt-blended using a Brabender® melt mixer. The bowl temperature was set at 260° C. and the mixer speed was kept constant at 40 rpm. All samples were mixed at these conditions for a maximum of 2 minutes.

TABLE 2

| Ingredients (wt %) | Formulation# | | | | |
|---|---|---|---|---|---|
| | 3 | 4 | 5 | 6 | 7 |
| Graphite fiber | 20.00 | 20.00 | 20.00 | 20.00 | 20.00 |
| Thermocarb ™ (graphite powder) | 57.00 | 57.00 | 57.00 | 57.00 | 57.00 |
| Zenite ® 800 | 23.00 | 21.00 | 18.00 | 13.00 | 3.00 |
| Dylark ® 232 | 0.00 | 2.00 | 5.00 | 10.00 | 20.00 |

The melt mixed material was used to mold flat 4"×4" plates on a 50 ton Wabash® compression press. The platen temperature was set at 280° C. and 50 g of material was fed into the mold cavity. This material was preheated for 10 minutes under a pre-clamp force of 2000 lbs. The clamp force was then increased to 8000 lbs and held there for 10 minutes. Subsequently, the clamp force was increased to 10000 lbs and kept there for 2 minutes. The plates were cooled to 90° C. under this pressure and finally the mold was opened to eject the molded plate. At least 4 plates were made with each formulation. These plates were subject to through plane resistivity testing as described above. The results are listed in Table 3.

It can be seen that the replacement of Zenite® 800 with a blend of Zenite® 800/Dylark® 232 results in lower through plane resistivity.

TABLE 3

| Formulation | Through plane Resistivity, Ω · cm | Standard deviation |
|---|---|---|
| 3 | 0.050 | 0.004 |
| 4 | 0.032 | 0.004 |
| 5 | 0.035 | 0.005 |
| 6 | 0.035 | 0.002 |
| 7 | 0.038 | 0.001 |

Example 3

The following example investigates the effect of incorporating SMA into bipolar plates made of LCP and graphite powder. Before use, both ZENITE®800 and DYLARK®332 were cryogenically ground to less than 1000 microns particle size in a BRINKMAN® lab scale cryogenic grinder. Table 4 below sets out the formulations used in this example. Formulations used in Example 3, by weight percent:

TABLE 4

Formulations used in Example 3, by weight percent:

| Ingredients: | Formulation, by weight % | | | | |
|---|---|---|---|---|---|
| | 8 | 9 | 10 | 11 | 12 |
| LCP (ZENITE ® 800) | 30.00 | 27.00 | 22.50 | 15.00 | 0.00 |
| THERMOCARB ® (graphite powder) | 70.00 | 70.00 | 70.00 | 70.00 | 70.00 |
| DYLARK ® 332 (powder) | 0.00 | 3.00 | 7.50 | 15.00 | 30.00 |

The procedure used to make plates from formulations 8 to 12 was as follows:

Step 1: Preparation of formulation:

a. About 200 g of each formulation was dry mixed by weighing the ingredients of each formulation in a polyethylene bag.

b. The bag containing the pre-weighed ingredients was inflated and the opening was tied.

c. The bag was shaken rigorously for 5-10 minutes by hand.

Step 2: Viscosity measurements:

Before compounding the formulations, the dependence of viscosity on temperature for each formulation was determined using steady shear temperature sweep in a parallel plate rheometer. All formulations have a viscosity of $10^6$ Pa*s at the temperatures mentioned in Table 5 below.

TABLE 5

Temperatures at which the viscosity is $10^6$ Pa * s:

| | Formulation | | | | |
|---|---|---|---|---|---|
| | 8 | 9 | 10 | 11 | 12 |
| Temperature (° C.) | 290 | 265 | 255 | 245 | 235 |

For this example, therefore, the melt mixing and compression molding of the plates was done at these temperatures for each of the respective formulations.

Step 3: Compounding:

Compounding was done in a BRABENDER® compounder. The mixer speed was kept constant at 40 rpm for all the formulations. 200 grams of each formulation was fed slowly into the hot bowl while the mixer was rotating. The compound was mixed for 2 min after the 200 g of mixture was completely fed into the bowl. The bowl was then opened and the material removed. The material was separated into smaller portions before cooling. The bowl temperature used for each formulation was the same as set out in Table 5 above, such that the resulting viscosity of all the formulations was kept constant at $10^6$ Pa*s.

Step 4: Compression molding:

A 4"×4" blank plate mold was preheated to the temperatures mentioned in Table 5 above depending on the formulation used. 50 g of the compounded formulation was placed in the mold for 10 min under a clamp force of 2000 lbs. The clamp force was then increased to 8000 lbs and maintained 10 min. Thereafter, the clamp force was increased to 10000 lbs and maintained for 2 min. At this point, the mold was cooled to a temperature of 90° C. while maintaining the same clamp pressure using water-cooling. Once the mold and plate were cooled to 90° C., the clamp was opened thereby releasing the pressure. The mold was then allowed to cool to room temperature prior to removing the formed plate.

Two plates were compression molded using this procedure for each of formulations 8 to 12. These plates were then analyzed for through plane resistivity using through plane resistance press, flex properties and density.

The results of the through plane resistivity analysis are set out in Table 6. It can be seen that the through plane resistivity of the plates made with formulation 8-12 are very close to each other and lie well within the acceptable values for fuel cell application.

TABLE 6

Through plane resistivity results:

| Plate Made From Formulation: | Wt % SMA | Through Plane Resistivity, (mΩ · cm) | Standard deviation |
|---|---|---|---|
| 8 | 0 | 47.50 | 2.77 |
| 9 | 3 | 52.00 | 2.95 |
| 10 | 7.5 | 47.70 | 2.26 |
| 11 | 15 | 62.70 | 1.25 |
| 12 | 30 | 58.93 | 6.51 |

The flex properties of the plates molded from each of the formulations 8 to 12 were tested using method ASTM D-790. The span was 2.5 inches and a crosshead speed of 0.08 in/min was employed. The results are set out in Table 7. The flex stress and strain results lie very close to each other considering 10% experimental error. Both through plane resistivity and flex properties of plates made with formulations 8 to 12 show that there is insignificant effect of addition of SMA to a blend of LCP and graphite powder.

TABLE 7

Flex properties of molded plates:

| Plate Made From Formulation: | Wt % SMA | Strain (in/in) | Standard deviation | Yield Stress (psi) | Stanadard deviation |
|---|---|---|---|---|---|
| 8 | 0 | 0.004 | 0.001 | 4772.13 | 506.2 |
| 9 | 3 | 0.005 | 0.001 | 4403.918 | 692.6 |
| 10 | 7.5 | 0.004 | 0.001 | 4687.72 | 356.4 |
| 11 | 15 | 0.003 | 0.001 | 3988.2 | 433.8 |
| 12 | 30 | 0.003 | 0.001 | 4562.34 | 955.1 |

The density of the plates made from each of the formulations was determined by cutting a small piece out of the molded plate and then measuring its density using the density determination kit supplied by OHAUS® model AP210S. The water temperature was 23° C., and its corresponding density is 0.998 g/ml. The density results are set out in Table 8 and plotted in FIG. 2, which shows the density of the molded plate as a function of the % weight of SMA in a LCP, SMA, 70% graphite powder tri-blend.

TABLE 8

Density of plates molded using formulations 8 to 12:

| Plate made from formulation | Run # | Density (g/ml) | Avg. Density (g/ml) | Std. Deviation |
|---|---|---|---|---|
| 8 | 1 | 1.8195 | | |
| | 2 | 1.8162 | 1.8182 | 0.0018 |
| | 3 | 1.8189 | | |
| 9 | 1 | 1.7852 | | |
| | 2 | 1.7790 | 1.7829 | 0.0034 |
| | 3 | 1.7844 | | |
| 10 | 1 | 1.7675 | | |
| | 2 | 1.7661 | 1.7685 | 0.0031 |
| | 3 | 1.7720 | | |
| 11 | 1 | 1.7321 | | |
| | 2 | 1.7353 | 1.7323 | 0.0029 |
| | 3 | 1.7294 | | |
| 12 | 1 | 1.6191 | | |
| | 2 | 1.6220 | 1.6244 | 0.0068 |
| | 3 | 1.6320 | | |

The following conclusions can be reached from Example 3:

a. The weight of plates made with a SMA, LCP and graphite powder tri-blend decreases as the amount of SMA in the blend is increased. This plate weight reduction is accompanied with no significant effect to plate through plane resistivity and flex properties.

b. The price of plates incorporating SMA is much less than that of plates made with LCP only because of the significantly lower cost of SMA. Therefore, the cost of making conductive plates is reduced without significantly affecting the plates' through plane resistivity and flex properties.

Example 4

Nova Chemicals, Beaver Valley, Pa. supplied SMA under the trade name of DYLARK®332. This is a clear grade containing about 14% maleic anhydride. E.I. DuPont de Nemours supplied LCP under the trade name of ZENITE®2000. This is a lower melt temperature grade of LCP (melting point: 230° C.). Both these polymers were cryogenically ground to less than 1000 microns using a BRINKMAN® lab scale cryogenic grinder.

About 50 grams of each of the formulations mentioned in Table 9 below were made:

TABLE 9

Formulations for Example 4. All compositions are by weight percent.

| | Formulation#, by weight % | | |
|---|---|---|---|
| Ingredients | 13 | 14 | 15 |
| LCP (ZENITE ® 2000) | 30 | 20 | 10 |
| Graphite powder | 40 | 60 | 80 |
| SMA(DYLARK ® 332 powder) | 30 | 20 | 10 |

The dry mixing of each of these blends was done in the following way:
a. The ingredients of the blends were weighed in a polyethylene bag.
b. The bag containing the pre-weighed ingredients was inflated and the opening was tied.
c. The bag was shaken rigorously for 5-10 minutes by hand.

The blended powder was then emptied directly into the mold. This mold was used to compression mold 4"×4"×⅛" plates.

Compression molding procedure involved pressing the mold at 260° C. at a pressure of 2 tons for 10 minutes. Thereafter the pressure was increased to 7.5 tons for 10 minutes, followed by 10 tons for 2 minutes. After this, the mold was cooled from 260° C. to 90° C. while maintaining the pressure at 10 tons. The conductivity properties of the plate were measured and reported in Table 10 below:

TABLE 10

Resistivity of Plates Made From Formulations 13, 14 and 15:

| Plate made from formulation | Plate thickness (mm) | Through plane resistivity (mΩ · cm) |
|---|---|---|
| 13 | 2.91 | 9881 |
| 14 | 2.67 | 215 |
| 15 | 2.53 | 62 |

Example 5

This example compares the rheological properties of pure SMA and LCP with that of LCP/SMA blends. Nova Chemicals, Beaver Valley, Pa. supplied SMA under the trade name of DYLARK®332. E.I. DuPont de Nemours supplied LCP under the trade name of ZENITE®800, which melts at above 260° C. Formulations 16-21 listed in Table 11 were first mixed together in an inflated bag and then melt blended using a 25 mm W&P extruder. The extrusion conditions are listed in Table 12.

TABLE 11

Formulations for Example 5.

| Ingredients (wt %) | Blend Compositions | | | | | |
|---|---|---|---|---|---|---|
| | 16 | 17 | 18 | 19 | 20 | 21 |
| LCP (ZENITE ® 800) | 0 | 20 | 40 | 60 | 80 | 100 |
| SMA (DYLARK ® 332) | 100 | 80 | 60 | 40 | 20 | 0 |

TABLE 12

| | 17 | 18 | 19 | 20 |
|---|---|---|---|---|
| Zone 1 (° C.) | 250 | 250 | 250 | 250 |
| Zone 2 (° C.) | 255 | 255 | 255 | 255 |
| Zone 3 (° C.) | 253 | 258 | 254 | 258 |
| Zone 4 (° C.) | 261 | 260 | 260 | 260 |
| Die (° C.) | 265 | 265 | 265 | 265 |
| Screw RPM | 275 | 270 | 250 | 250 |
| Torque, % | 40 | 40 | 44 | 46 |
| Die pressure, psi | 108 | 107 | 89 | 81 |
| Melt temperature, ° C. | 268 | 265 | 265 | 265 |
| Approximate throughput, kg/hr | 6 | 6 | 6 | 6 |

The extruded strands were cooled in a water bath and fed into a Scheer® strand cutter Model SGS. The resulting pellets were subjected to capillary rheometry. A capillary rheometer from Kayeness Inc. a Dynisco Company model LCR5000 or Galaxy V model #8052 with 4.5 kN load cell was used for obtaining the apparent viscosities at temperatures in between 240° C. and 320° C.

Figure 3A:
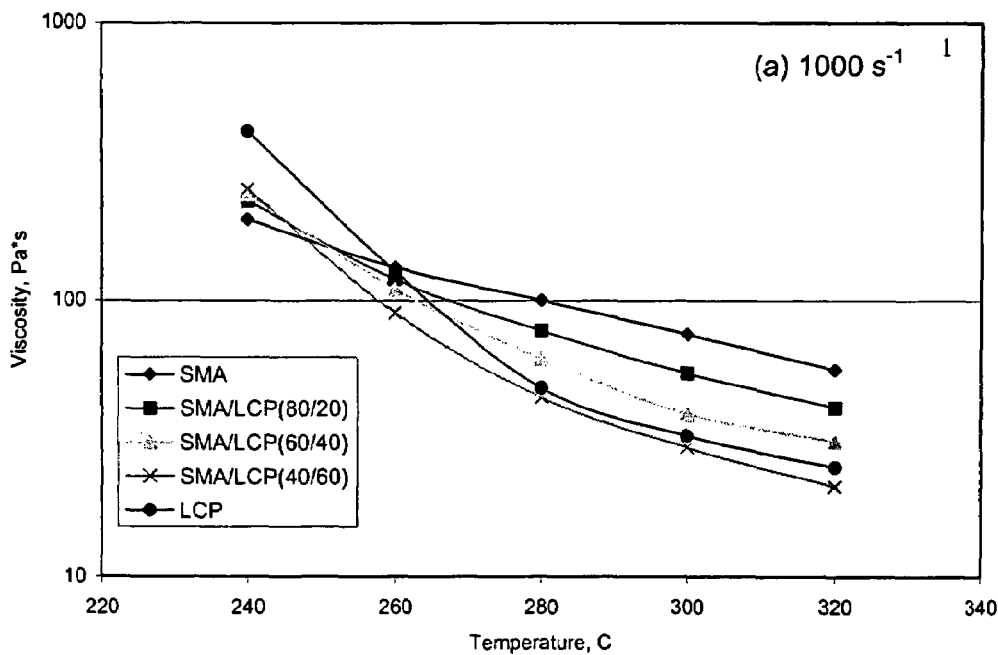
FIGS. 3(a) and (b) illustrate the dependence of viscosity on temperature for various blends of SMA and LCP at a shear rate of 1000 s$^{-1}$ and 10000 s$^{-1}$, respectively.
Figure 3B:
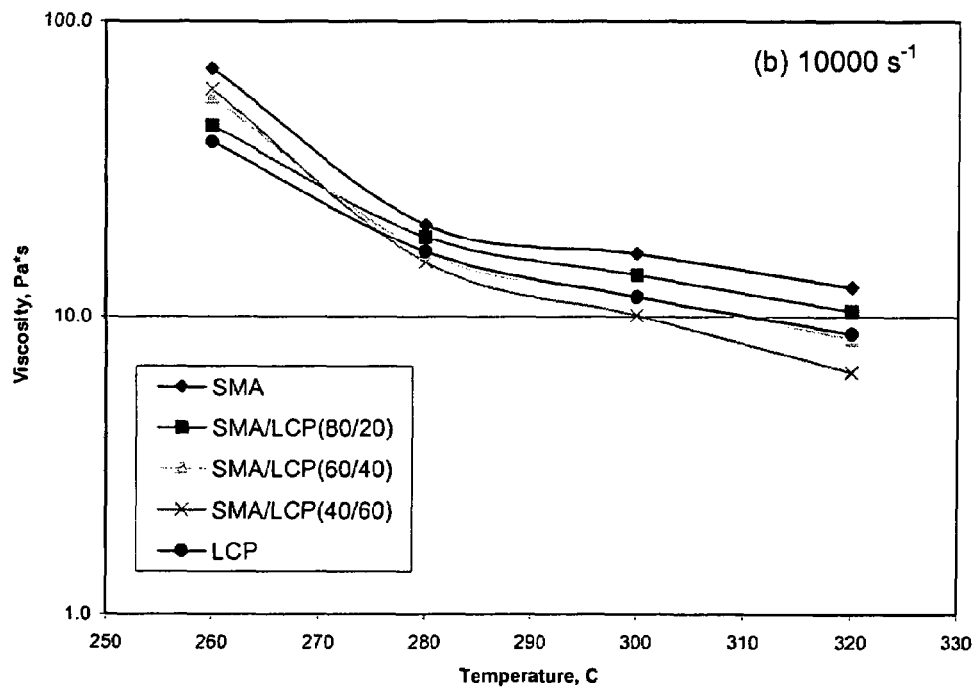

The apparent viscosity obtained at a shear rate of $1000\ s^{-1}$ is shown in FIG. 3a. It can be noted that at temperatures above 260° C. the addition of more than 60% SMA to LCP increases its viscosity. This temperature also happens to be the melt temperature of LCP. Therefore use of more than approximately 50% (interpolated value) by weight SMA increases the viscosity of the LCP/SMA blend to higher values than the viscosity of pure LCP. At a shear rate of $10000\ s^{-1}$ (FIG. 3b), blends with SMA content above 40% have a viscosity higher than pure LCP at temperatures below 280° C. Therefore adding more than 40% by weight SMA to LCP increases the blend's viscosity to levels higher than pure LCP for shear rates in between $1000\text{-}10000\ s^{-1}$.

Example 6

In this example, plates were made from a mixture of LCP, SMA and graphite powder using a wet blending technique. ZENITE®800 was cryogenically ground to about 500 micron average size. SMA was obtained in an emulsion form from Chemcor Inc., NY under the trade name of SMA1000®. The properties of SMA1000® emulsion include: 1:1 ratio of styrene:maleic anhydride, 25% solids, melting point of dried emulsion is in-between 150-170° C.

TABLE 13

Formulation 22 for Example 6:

| Ingredients | Formulation 22 (wt. %) |
|---|---|
| LCP (ZENITE ® 800) | 16.7 |
| Graphite powder | 66.7 |
| SMA1000 ® (dried content) | 16.7 |

The liquid blending procedure used was as follows:
a. The ingredients of the formulation were weighed separately.
b. 40 g of graphite powder were added slowly to a beaker containing 600 ml of tap water, while stirring.
c. 10 g of ZENITE®800 powder was then added slowly.
d. Stirring continued until a slurry was formed and then 40 g of SMA1000® emulsion was added.
e. The slurry was heated while continuously stirring with a magnet until the water evaporated and a paste was obtained.
f. The paste was placed in a vacuum oven at about 170° C. for 6 hours until all moisture was removed.

This dried blend was then compression molded at 320° C. using the same pressure cycle as in Example 1 in order to make a 4"×4"×⅛" plate. The conductive properties of this plate were measured as follows:

TABLE 14

Resistivity of Plates Made From Formulation 22:

| Plate made from formulation | Sample thickness (mm) | Average resistivity from 4 point probe (mΩ · cm) | Through plane resistivity (mΩ · cm) |
|---|---|---|---|
| 4 | 3.24 | 7.2 | 55.8 |

Although the present invention has been shown and described with respect to its preferred embodiments and in the examples, it will be understood by those skilled in the art that other changes, modifications, additions and omissions may be made without departing from the substance and the scope of the present invention as defined by the attached claims.

What is claimed is:

1. A conductive flow field separator plate, comprising:
   (a) from about 0.5 wt % to about 40 wt % of liquid crystal polymer;
   (b) from about 0.5 wt % to about 40 wt % of poly(styrene-co-maleic anhydride); and
   (c) from about 20 wt % to about 99 wt % of conductive filler.

2. The conductive flow field separator plate of claim 1, wherein said plate comprises:
   (a) from about 1 wt % to about 30 wt % of the liquid crystal polymer;
   (b) from about 1 wt % to about 30 wt % of the poly(styrene-co-maleic anhydride); and
   (c) from about 60 wt % to about 98 wt % of the conductive filler.

3. The conductive flow field separator plate of claim 2, wherein said plate comprises:
   (a) from about 5 wt % to about 20 wt % of the liquid crystal polymer;

(b) from about 5 wt % to about 20 wt % of the poly(styrene-co-maleic anhydride); and
(c) from about 70 wt % to about 90 wt % of the conductive filler.

4. The conductive flow field separator plate of claim 1, wherein the liquid crystal polymer is liquid crystalline polyester.

5. The conductive flow field separator plate of claim 4, wherein the conductive filler is graphite filler or carbon nanotubes.

6. The conductive flow field separator plate of claim 5, wherein the graphite filler is selected from the group consisting of graphite fibre filler, graphite powder filler and mixtures thereof.

7. The conductive flow field separator plate of claim 1, wherein the poly(styrene-co-maleic anhydride) contains from about 1% to about 75% maleic anhydride moieties.

8. The conductive flow field separator plate of claim 7, wherein the poly(styrene-co-maleic anhydride) contains from about 1% to about 50% maleic anhydride moieties.

9. The conductive flow field separator plate of claim 7, wherein the poly(styrene-co-maleic anhydride) contains from about 1% to about 32% maleic anhydride moieties.

* * * * *